United States Patent
Kasugai et al.

(10) Patent No.: US 6,333,091 B1
(45) Date of Patent: Dec. 25, 2001

(54) BAR-SUPPORTIVE BUFFER SHEET

(75) Inventors: Joji Kasugai, Ichinomiya; Yasuyuki Tanaka; Hideyuki Fujiwara, both of Inazawa, all of (JP)

(73) Assignee: Toyoda Gosei Co., Ltd., Aichi (JP)

( * ) Notice: Subject to any disclaimer, the term of this patent is extended or adjusted under 35 U.S.C. 154(b) by 0 days.

(21) Appl. No.: 09/197,768

(22) Filed: Nov. 23, 1998

(30) Foreign Application Priority Data

Nov. 21, 1997 (JP) .................................................. 9-337957

(51) Int. Cl.$^7$ .................................................. H01M 2/10
(52) U.S. Cl. .................... 428/131; 428/188; 429/96; 429/99; 429/100
(58) Field of Search .................... 428/36.9, 131, 428/132, 167, 188; 429/96, 99, 100; 220/23.83, 512, DIG. 15

(56) References Cited

U.S. PATENT DOCUMENTS

| 4,221,854 | * | 9/1980 | Hammer et al. ....................... 429/234 |
| 4,286,362 | * | 9/1981 | Hammar et al. .......................... 29/2 |
| 4,443,523 | * | 4/1984 | Hasenauer ............................. 429/99 |
| 4,885,219 | * | 12/1989 | Miller .................................... 429/99 |
| 5,296,320 | * | 3/1994 | Ginatta et al. ...................... 429/210 |
| 5,618,642 | * | 4/1997 | Samii et al. ........................ 429/247 |
| 6,111,387 | * | 8/2000 | Kouzu et al. ....................... 320/107 |
| 6,130,003 | * | 10/2000 | Etoh et al. ............................ 429/99 |

* cited by examiner

Primary Examiner—Blaine Copenheaver
Assistant Examiner—Alicia Chevalier
(74) Attorney, Agent, or Firm—Pillsbury Winthrop LLP

(57) ABSTRACT

A sheet part, tubular parts and protruding parts of the buffer sheet are molded by elastic high-polymer material which is added with such a quantity of lowly compatible oil as necessary for effective lubrication by bleeding after molding. The protruding parts are a plurality of ribs which extend in a longitudinal direction of the tubular part, and two are formed on the lower part of the inner circumferential surface while one is formed on each of the right lateral side part, the left lateral side part and the upper part. The elastic deformation of protruding parts creates tightening margins as an effect of pressurizing contact of the storage battery module, and thus the storage battery module is supported with buffering effect while the play is eliminated.

18 Claims, 3 Drawing Sheets

BAR-SUPPORTIVE BUFFER SHEET

BACKGROUND OF THE INVENTION

1. Field of the Invention

The present invention relates to a buffer sheet which is utilized for support of bar-shape objects in a storage battery, a condenser, a liquid-filled cylindrical container or the like.

2. Description of the Related Art

Bar-shape modules of storage battery for use in electric vehicles have been considered. As a support for such bar-shape objects (storage battery modules) so as to be protected from generated heat of their own and vibration of the vehicle, there has been a discussion on a bar-supportive box molded by resin, which has a plurality of supportive plates which respectively have supportive holes for insertion of the bar-shape objects and which are disposed to the right and left with some space between in such a manner that the holes in the plates are aligned linearly and a pair of front and rear connection walls which connect the front and rear side edges of the supportive plates.

To ensure protection of the bars from the vibration, it is desirable that the aforementioned supportive plates are fitted with buffer sheets which are molded by rubber, soft resin or thermoplastic elastomer. There have been discussions on buffer sheet which is molded by elastic high-polymer material such as rubber, soft resin or thermoplastic elastomer so that each plate-shape sheet part and tubular parts which are to be inserted into the aforementioned supportive holes thereof form a single body.

This buffer sheet, however, has a problem that an extremely large resistance thereof hinders smooth insertion of the bars into the tubular parts. The problem is thought to be caused by a high friction factor of the inner circumferential surface of the tubular parts which are molded by elastic material, a configurational necessity that the inner diameter of the tubular part should be slightly smaller than the outer diameter of the bars so as to prevent support of the bars from playing, the inner circumferential surface of the tubular part tends to stick to the outer circumferential surface of the bar-shape object due to extensive contact areas thereof, or such. If the inner diameter of the tubular part is formed to be slightly larger than the outer diameter of the bar, the insertion becomes smoother but play of the bar-shape object tends to result in damages or deterioration thereof.

SUMMARY OF THE INVENTION

The provides a bar-supportive buffer sheet which solves the above-described problems, wherein the bars are easily inserted while being effectively supported with a buffer function and without play after the insertion.

The above-described objectives are achieved by a bar-supportive buffer sheet which is characterized in that a tubular part, in which a bar-shape object is to be inserted through, is molded by an elastic, high-polymer material that is added to a quantity of lowly compatible oil as necessary for effective lubrication by bleeding after molding. The elastic high-polymer material may include rubber, soft resin and thermoplastic elastomer.

The oil lowly compatible to the elastic high-polymer material may include paraffin processed oil for high-polarity, high-polymer materials (for example, NBR (butadieneacrylonitrile copolymer) rubber) and ester plasticizer for low-polarity high-polymer materials (for example, EDPM (ethylene-propylene-diene copolymer) rubber).

In a case where the bar-shape object is an electric part such as a storage battery or a condenser, it is unfavorable that bled oil which flows and spreads while travelling over a surface of the bar-shape object can osmose into a contact part or such and cause a contact failure. Therefore, such oil as being liable to flow and spread over the surface of the bar-shape object, in other words, such oil as having a low surface tension and a high fluidity (for example, silicon oil) is not favorable but such oil as being not liable to flow and spread over the surface of the bar-shape object, in other words, such oil as having a high surface tension and a low fluidity (for example, paraffin processed oil or ester plasticizer) is favorable.

Additionally, it is favorable that the hardness of the elastic high-polymer material after molding is between 60 Hs and 80 Hs (according to JIS K 6301, spring-type hardness test, type A). If the hardness is lower than 60 Hs, the material is too soft to insert the bar-shape object through with ease and, if the hardness is higher than 80 Hs, the material is too hard to perform sufficient buffering effect.

Moreover, it is also favorable that protruding parts where the bar-shape object is pressed against so as to be in contact with the inner circumferential surface of the tubular part are molded with the elastic high-polymer material so as to form a single body. This prevents adhesion through reduction in contact area of the inner circumferential surface of the tubular part and the outer circumferential surface of the bar-shape object, and also provides support to the bar-shape object with elimination of play and also with a buffering effect through creation of tightening margins by elastic deformations of the protruding parts as an effect of pressurizing contact of the bar-shape object.

The configuration of the protruding part is not defined specifically and, although it is possible to exemplify with a plurality of ribs which extend in a longitudinal direction of the tubular part, a plurality of dispersively positioned projections or an annular rib which extends in circumferential direction of the tubular part, the former two, or the plural ribs and projections are favorable. The annular rib requires some force at start of the insertion.

When the protruding parts are the plural ribs or the plural projections, it is favorable that a relatively larger number of the protruding parts are formed on a lower part of an inner circumferential surface of the tubular part than on the other parts. Although a permanent strain phenomenon is liable to occur in a long period of time at the lower part which receives weight of the bar-shape object, if a relatively large number of protruding parts are provided, the amount of permanent strain at each of the protruding parts can be reduced, and thus the bar-shape objects can be ensured to be supported for the long period of time.

DETAILED DESCRIPTION OF THE PREFERRED EMBODIMENTS

Figure 1:
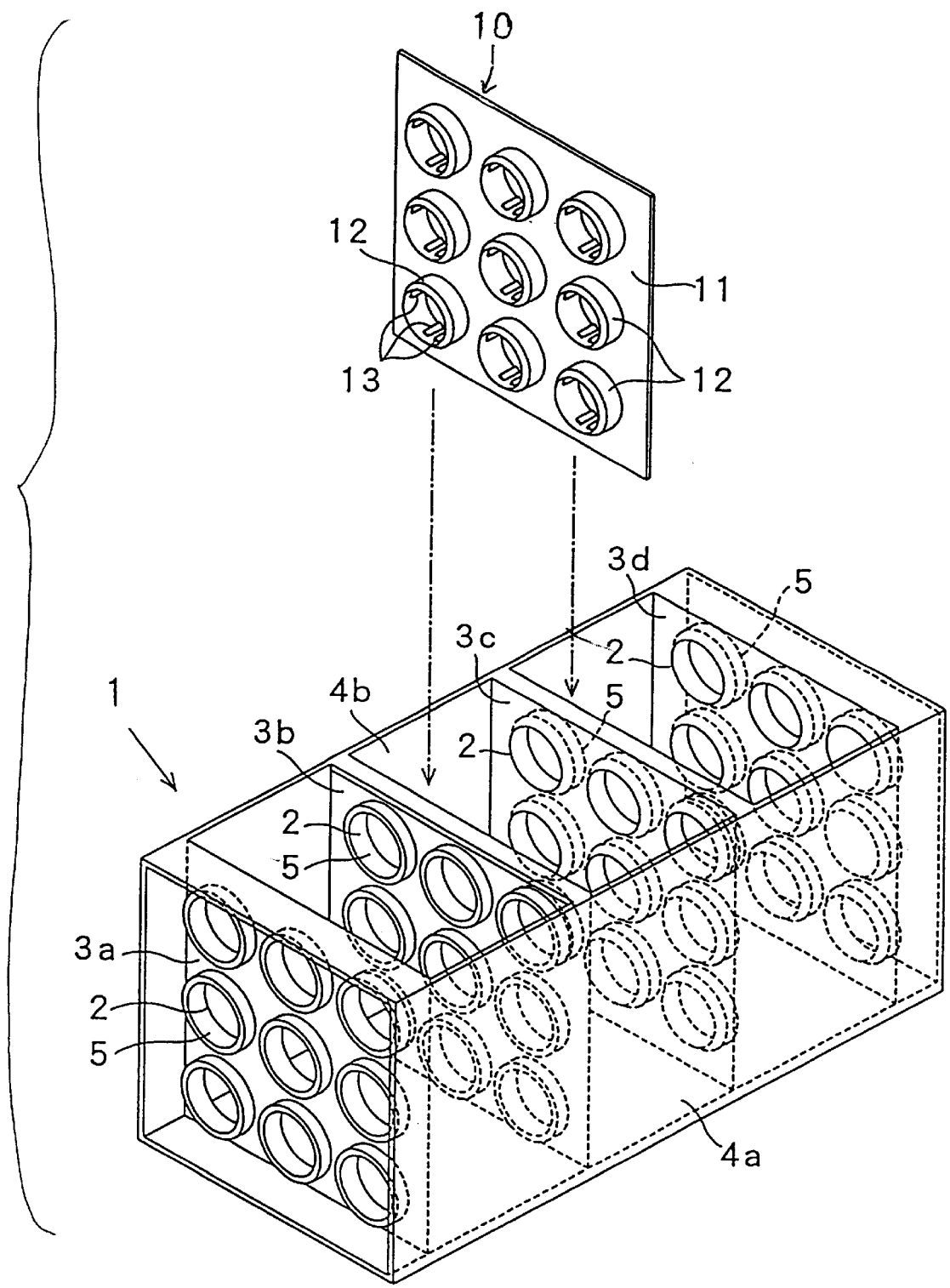
FIG. 1 is a perspective drawing of the bar-supportive box and buffer sheets which are related to the present invention.
Figure 2:
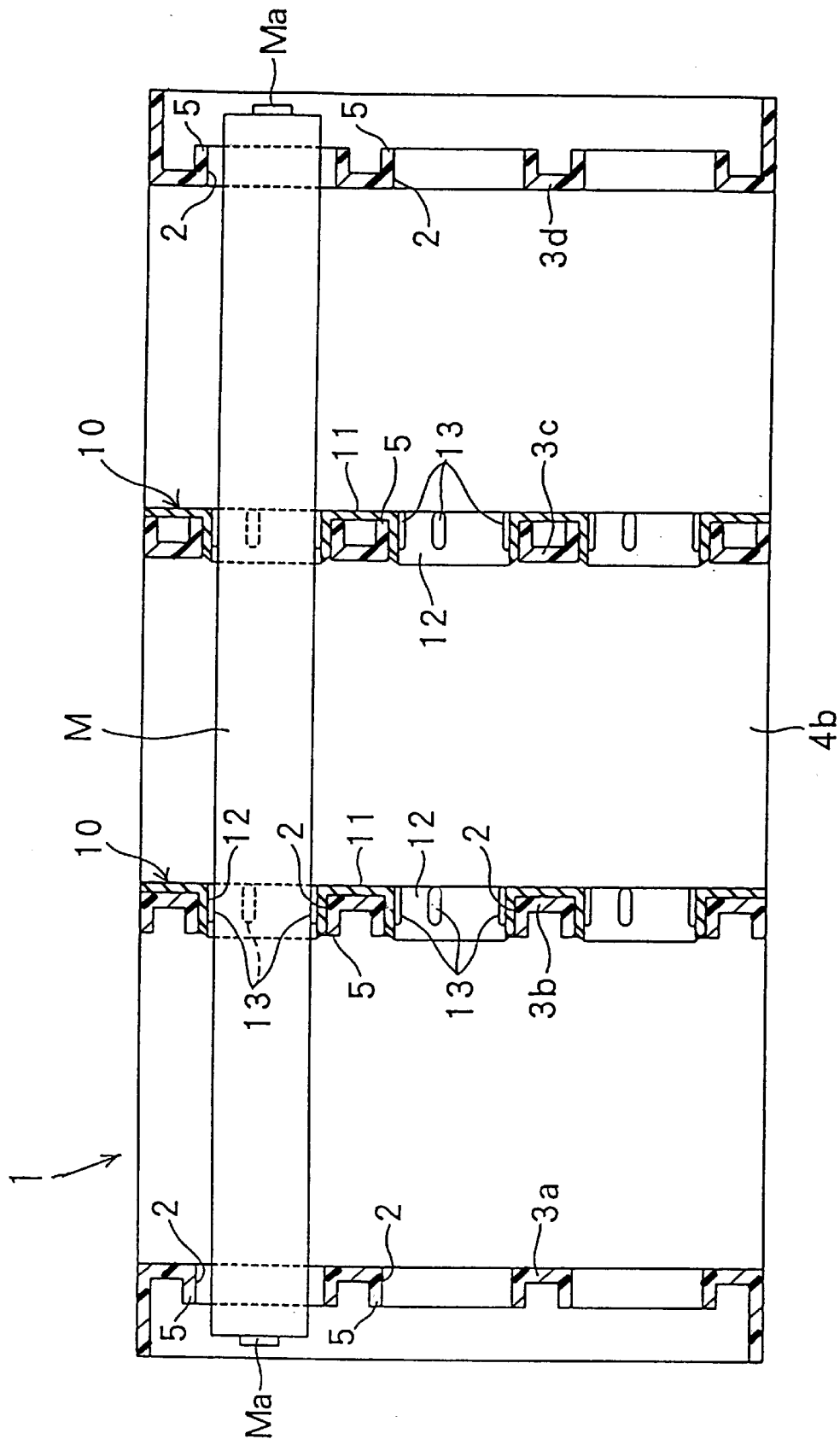
FIG. 2 is a cross-sectional drawing of the same bar-supportive box and buffer sheets.

With references to drawings, now described are the aforementioned buffer sheets for support of bar-shape objects of storage battery (storage battery modules) which exemplify the modes for carrying out the present invention. As shown in FIGS. 1 and 2, a bar-supportive box 1 where buffer sheets 10 are mounted is molded by highly rigid resin (for example, fiber-reinforced resin, such as glass-fiber-reinforced 6-nylon in this embodiment), wherein four sheets of supportive plates 3a, 3b, 3c and 3d which respectively have nine supportive holes 2 for insertion of the storage battery modules M and which are disposed to the right and left with some space between in such a manner that the holes 2 in the plates are aligned linearly and a pair of front and rear connection-walls 4a and 4b which connect the front and rear side edges of the supportive plates 3a through 3d are molded to form a single body.

Each of the supportive plates 3a and 3b which are disposed to the left side from the center as viewed from the front side has nine tubular ribs 5 which protrude to the left from vicinities of the supportive holes 2 on the left side thereof and which are molded so as to form a single body. Each of the supportive plates 3c and 3d which are disposed to the right side from the center as viewed from the front side has nine tubular ribs 5 which protrude to the right from vicinities of the supportive holes 2 on the right side thereof and which are molded so as to form a single body. Inner circumferential surfaces of the tubular ribs 5 continue to inner circumferential surfaces of the supportive holes 2 so that lengths of the supportive holes 2 are substantially extended by such tubular ribs 5. The supportive plates 3a, 3b, 3c and 3d are 3 to 7 mm thick while the lengths of protrusion of the tubular ribs 5 from the supportive plate surfaces are 3 to 7 mm and inner diameters of the supportive holes 2 and tubular ribs 5 are 30 to 50 mm.

The buffer sheets 10 are mounted on the two supportive plates 3b and 3c which are disposed at the center of the bar-supportive box 1. Additionally, the buffer sheets 10 may also be mounted on the supportive plates 3a and 3d. A plate-shape sheet part 11, nine tubular parts 12 that protrude from such sheet part 11 and protruding parts 13 which protrude from inner circumferential surface of each of the tubular parts 12 toward a central direction constitute each of the buffer sheets 10 and are molded to form a single body of elastic high-polymer material which is added with such a quantity of lowly compatible oil as necessary for effective lubrication by bleeding after molding. The sheet part 11 is placed on the surface of the supportive plate 3b and at the protruding ends of the tubular ribs 5 on the supportive plate 3c while the tubular parts 12 are inserted into the supportive holes 2 in the supportive plates 3b and 3c and also into the bores of the tubular ribs 5. The protruding parts 13 are a plurality of ribs which extend in a longitudinal direction of the tubular part 12.

In this embodiment, a polymer blend of the NBR rubber and the PVC (polyvinyl chloride) resin is utilized as the elastic high-polymer material while lowly-viscous paraffin processed oil is utilized as the oil and three weight parts of lowly-viscous paraffin processed oil is added to one hundred weight parts of the aforementioned polymer blend. The hardness of the elastic high-polymer material (11, 12 and 13 in each part) after molding is approximately 70 Hs.

Figure 3:
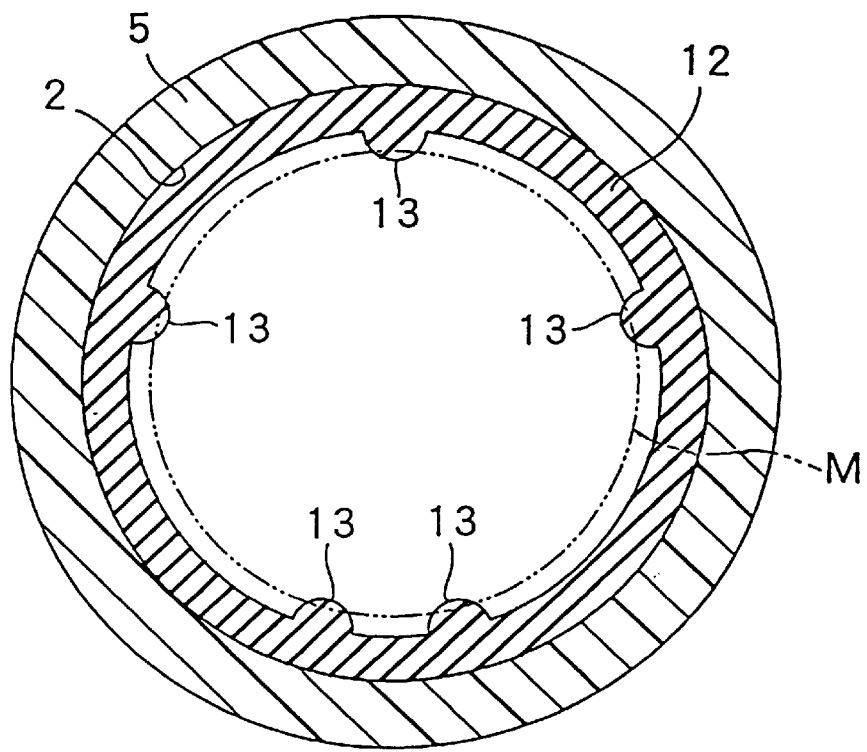
FIG. 3 is a cross-sectional drawing of a part of the same bar-supportive box and buffer sheets.
Figure 4:
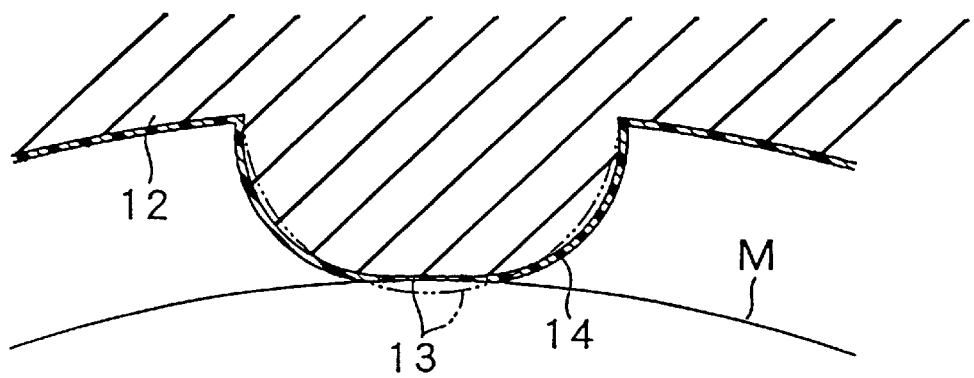
FIG. 4 is a magnified cross-sectional drawing of a pressurized contact part of the same buffer sheet and the storage battery module.

As shown in FIGS. 3 and 4, the outer diameter of the tubular part 12 is approximately the same as inner diameters of the supportive hole 2 and the tubular ribs 5. The inner diameter of the tubular part 12 is larger than the outer diameter of the storage battery modules M and the difference is 0.2 to 2.0 mm (desirably 0.5 to 1.0 mm). A half of the difference is reserved as clearance between the tubular part 12 and the storage battery modules M and the heights of the protruding parts 13 are the same as or larger than the clearance by the difference of 1 mm or less (desirably 0.2 to 0.5 mm). Therefore, this difference is reserved as a tightening margin for the storage battery module M by the protruding parts 13. Two of the protruding parts 13 are formed on the lower part of the inner circumferential surface of the tubular part 12 while one is formed on each of the right lateral side part, the left lateral side part and the upper part, that is to say that the relatively larger number of protruding parts are formed on the lower part than on the other parts.

As shown in FIG. 2, the storage battery module M (there are a total of nine modules but only one is shown in the figure for convenience) is inserted into and supported by the supportive holes 2 in the supportive plates 3a through 3d, which are linearly aligned, and, specially at the supportive plates 3b and 3c, the module M is inserted into and supported by the supportive holes 2 and the tubular ribs 5 via the tubular parts 12 of the buffer sheets 10. Both end parts of the nine storage battery modules are enclosed and supported by end walls (not shown in the figures) and, when electrodes Ma of the storage battery modules M come into contact with wiring elements (not shown in the figures) which are provided on such end walls, the nine storage battery modules M are connected in series (or in parallel).

In accordance with the buffer sheet 10 in the present embodiment, the following functions (1) through (5) facilitate smooth insertion of the storage battery modules M and support the storage battery modules M with an effective buffering function to eliminate the play after insertion. (1) Since the buffer sheet 10 is molded by elastic high-polymer material which is added with such a quantity of lowly compatible oil as necessary for effective lubrication by bleeding after molding, as shown in FIG. 4, the bled oil 14 on the surface of the protruding parts particularly perform lubrication effect when the storage battery module M is inserted through. (2) The hardness of the elastic high-polymer material after molding is approximately 70 Hs, which is hard enough for smooth insert and soft enough for to perform sufficient buffering effect. (3) Since the protruding parts 13 are formed on the inner circumferential surface of the tubular part 12 as the molded single piece, adhesion caused by reduction in contact area of the inner circumferential surface of the tubular part and the outer circumferential surface of the bar-shape object can be prevented. Moreover, since the tightening margins are created by elastic deformations of the protruding parts 13 as an effect of pressurizing contact of the storage battery module M, the storage battery module M can be supported by buffering effect while the play is eliminated. (4) Since the protruding parts 13 are the plural ribs which extend in a longitudinal direction of the tubular part 12, the storage battery module M can be inserted smoothly. (5) Since the relatively larger number of protruding parts are formed on the lower part of an inner circumferential surface of the tubular part than on the other parts, the amount of permanent strain at each of the protruding parts 13 can be reduced and thus the storage battery module M can be ensured to be supported for the long period of time.

The present invention is not restricted to the above-described mode of embodiment but may be embodied in other modes with appropriate changes as are within the scope of the invention, as exemplified below:

(1) Appropriate changes in the number and disposition of the tubular parts 12 on the buffer sheet 10.

(2) Appropriate changes in the number and disposition of the protruding parts 13 at the tubular. part 12.

(3) Applications of the buffer sheet for support of various types of bar-shape objects, besides the storage battery modules M, in condenser, liquid-filled cylindrical container and such.

As described above in detail, the bar-supportive buffer sheet according to the present invention is extremely effective in the realization of smooth insertion of the bar-shape objects and support of the bar-shape objects with buffering effect through elimination of the play after insertion.

What is claimed is:

1. A bar-supportive buffer sheet comprising:
   a sheet part having at least one orifice, said orifice being defined by an inner edge of said sheet part; and
   at least one tubular part protruding from said sheet part and having an inner surface, said inner surface and said inner edge together define a channel, said channel being constructed and arranged to receive a bar-shaped object,
   wherein said sheet part and said tubular part are integrally molded of an elastic polymeric material and wherein said material contains an effective quantity of oil to lubricate said channel by bleeding after molding.

2. A bar-supportive buffer sheet according to claim 1, wherein said material has a hardness after molding between 60 Hs and 80 Hs.

3. A bar-supportive buffer sheet according to claim 1, further comprising at least one protruding part integrally molded with said tubular part at said inner surface, said protruding part protruding into said channel toward a central direction of said tubular part and extending in a longitudinal direction of said tubular part.

4. A bar-supportive buffer sheet according to claim 1, further comprising a plurality of protruding parts at said inner surface, said protruding parts comprising a plurality of ribs protruding into said channel toward a center direction of said tubular part and extending in a longitudinal direction of said tubular part.

5. A bar-supportive buffer sheet according to claim 4, wherein more of said protruding parts are formed on a lower part of said inner surface of said tubular part than on an upper part of said inner surface of said tubular part.

6. A bar-supportive buffer sheet according to claim 1, further comprising a plurality of protruding parts at said inner surface, said protruding parts comprising a plurality of dispersively positioned projections protruding into said channel toward a center direction of said tubular part and extending in a longitudinal direction of said tubular part.

7. A bar-supportive buffer sheet according to claim 1, wherein said tubular part has a circular cross section.

8. A bar-supportive buffer sheet according to claim 1, wherein said rubber comprises a member selected from the group consisting of butadiene-acrylonitrile copolymer rubber and ethylene-propylene-diene copolymer rubber.

9. A bar-supportive buffer sheet according to claim 1, wherein said elastic polymeric material comprises a resin selected from the group consisting of glass-fiber-reinforced 6-nylon resin and polyvinyl chloride resin.

10. A bar-supportive buffer sheet according to claim 1, wherein said elastic polymeric material comprises a butadiene-acrylonitrile copolymer and polyvinyl chloride resin, and wherein said oil comprises paraffin processed oil.

11. A bar-supportive buffer sheet according to claim 10, wherein said effective quantity of oil is three weight parts of said paraffin processed oil to one hundred weight parts of said elastic polymeric material.

12. A bar-supportive buffer sheet according to claim 1, wherein said elastic polymeric material comprises ethylene-propylene-diene copolymer and said oil comprises an ester plasticizer.

13. A bar-supporting buffer sheet comprising:
    a sheet part having at least one orifice, said orifice being defined by an inner edge of said sheet part;
    at least one tubular part protruding from said sheet part and having an inner surface, said inner surface and said inner edge together define a channel; and
    a bar-shaped object received in said channel,
    wherein said sheet part and said tubular part are integrally molded of an elastic polymeric material and wherein said material contains an effective quantity of oil to lubricate the channel by bleeding after molding.

14. A bar-supporting buffer sheet according to claim 13, wherein said material has a hardness after molding between 60 Hs and 80 Hs.

15. A bar-supporting buffer sheet according to claim 13, further comprising at least one protruding part integrally molded with said tubular part at said inner surface, said protruding part protruding into said channel toward a central direction of said tubular part and extending in a longitudinal direction of said tubular part, so that said bar-shape object is pressed against said protruding part.

16. A bar-supporting buffer sheet according to claim 15, further comprising a plurality of protruding parts at said inner surface, said protruding parts comprising a plurality of ribs protruding into said channel toward a center direction of said tubular part and extending in a longitudinal direction of said tubular part.

17. A bar-supportive buffer sheet according to claim 16, wherein more of said protruding parts are formed on a lower part of said inner surface of said tubular part than on an upper part of said inner surface of said tubular part.

18. A bar-supporting buffer sheet according to claim 15, further comprising a plurality of protruding parts at said inner surface, said protruding parts comprising a plurality of dispersively positioned projections protruding into said channel toward a center direction of said tubular part and extending in a longitudinal direction of said tubular part.

* * * * *